United States Patent [19]

Dannelly et al.

[11] 3,940,261
[45] Feb. 24, 1976

[54] PROCESS FOR PREPARING CRYSTALLINE SILVER PARTICLES HAVING ELECTRICALLY CONDUCTIVE SURFACES AND PRODUCT

[75] Inventors: Clarence C. Dannelly; John M. McIntire, both of Kingsport, Tenn.

[73] Assignee: Eastman Kodak Company, Rochester, N.Y.

[22] Filed: Feb. 3, 1975

[21] Appl. No.: 546,661

Related U.S. Application Data

[63] Continuation-in-part of Ser. No. 492,795, July 24, 1974, abandoned.

[52] U.S. Cl.................. 75/.5 A; 75/108; 75/118 R; 75/118 P
[51] Int. Cl.$^2$............................................ C22B 5/00
[58] Field of Search......... 75/118, 118 P, .5 A, 108, 75/83

[56] References Cited
UNITED STATES PATENTS

| | | | |
|---|---|---|---|
| 3,201,223 | 8/1965 | Cuhra et al. | 75/.5 A |
| 3,345,158 | 10/1967 | Block et al. | 75/108 |
| 3,390,981 | 7/1968 | Hoffman | 75/108 |
| 3,820,979 | 6/1974 | Manassen | 75/108 |

*Primary Examiner*—G. Ozaki
*Attorney, Agent, or Firm*—William P. Heath, Jr.; Daniel B. Reece III

[57] ABSTRACT

Processes are disclosed for preparing large crystalline silver particles having exceptionally conductive surfaces. The particles may be prepared by the reduction of a water soluble silver salt in an acidified aqueous solution by a redox reaction. Silver particles having conductive surfaces may also be prepared by treating commercial silver powder with a phenolic reducing compound such as hydroquinone dissolved in a polar solvent such as a lower alcohol.

The silver powders obtained by the processes have very low electrical contact resistance and furthermore retain this low contact resistance even though the powders are exposed to air and airborne contaminants.

8 Claims, No Drawings

PROCESS FOR PREPARING CRYSTALLINE SILVER PARTICLES HAVING ELECTRICALLY CONDUCTIVE SURFACES AND PRODUCT

This is a continuation-in-part application of Application Ser. No. 492,795, filed July 24, 1974, now abandoned.

This invention relates to a new process for preparing large crystalline silver particles having exceptionally conductive surfaces which make these particles useful in imparting conductivity to adhesives, coatings, plastics, and other items where the flow of current is needed.

The silver particles having electrically conductive surfaces may be prepared by the reduction of a water soluble silver salt in an acidified aqueous solution by a redox reaction. A second method of preparation of silver particles having electrically conductive surfaces involves treating a commercial silver powder with a phenolic reducing compound such as hydroquinone dissolved in a polar organic solvent such as a lower alcohol wherein the solute/solvent weight ratio is in the range of 0.1/100 to 10/100. The silver powders obtained by either method have very low electrical contact resistance and furthermore retain this low contact resistance even though the powders are exposed to air and airborne contaminants.

The reduction of silver nitrate, particularly by substances such as hydroquinone is well known and forms the basis for the photographic industry. However, this chemistry is performed under alkaline conditions on highly dispersed silver nitrate and results in the formation of colloidal silver metal which has unclean surfaces and displays essentially no conductive properties. The chemistry of this reaction has been studied by three scientists [T. H. James, J. Phys, Chem. 45, p. 223 (1941) and G. P. Fearman and E. D. Voeikova, Trudy Soveschaniya Elektrokhim., Akad. Nauk S.S.S.R., Otdel Khim. Nauk 1950, p. 212 (1953)] in neutral to alkaline aqueous solutions, but under these conditions a colloidal silver is also formed which is difficult to isolate and purify and is unsuitable for use as a conductive agent.

The silver particles of this invention are preferably prepared from silver nitrate dissolved in acidified aqueous solutions by a redox reaction. The reducing agents which perform satisfactorily in this process have only a slightly lower electrochemical potential than does the reduction of silver ion to silver metal. This closeness of potential allows the reduction to proceed at a rate sufficient to enable the formation of large crystalline silver particles. For practice of this invention the reducing agents of value have oxidation potentials within the range of the single electrode potential of silver to −0.150 volts below that of silver when measured by the technique described hereinafter.

The acidified solution results in the formation of silver metal which has exceptionally clean, conductive surfaces. There are a wide variety of materials which will function as a reducing agent in this redox system, but there are only a few reducing agents which give large crystalline silver particles (approximately 10–100 microns in size) during this reduction. Most reducing agents cause very rapid reduction of the silver nitrate and result in the formation of colloidal silver particles (<1 micron in size) which are difficult to isolate and purify. Because of extreme difficulties in obtaining clean surfaces on these particles and their small size, they are unsatisfactory for use in this invention.

It is well known that single electrode potentials are difficult to measure with accuracy and precision. The electrochemical potential measurements can be made with an approximately $10^{-4}$ molar solution of the compound in an electrolyte; for example, methanol which is 0.05 molar in lithium chloride. A dropping mercury electrode can be used for the cathodic measurement with the polarographic half-wave potential for the first cathodic response in potential designated $E_c$. A pyrolytic graphite electrode can be used for the anodic measurement with the voltammetric half-peak potential for the first anodic response in potential designated $E_a$. In each measurement, the reference electrode is a saturated Calomel electrode at 20°C. The potential values are reported by reference to a silver-silver chloride electrode in a saturated solution of potassium chloride at 20°C. Plus and minus signs are assigned to the potential values according to the IUPAC Stockholm Convention 1953. The $E_a$ and $E_c$ values so measured shall not include processes in which electron transfer is primarily the result of the presence in solution of the counter ion of a positively charged dye or other such chemical entities insolution that are not an integral part of, or attached to, the chromophoric system of the dye. A response of lesser current magnitude preceding the primary response, such as a prewave resulting from adsorption of the electrolysis product to the electrode surface, shall be excluded from designation as $E_a$ or $E_c$.

Electrochemical measurements of this type are known in the art and are described in one or more of the following reference texts: *New Instrumental Methods in Electrochemistry*, by Delahay, Interscience Publishers, New York, N.Y., 1954; *Polarography*, by Kolthoff and Lingane, 2nd Edition, Interscience Publishers, New York, N.Y., 1952; and *Electrochemistry at Solid Electrodes*, by Adams, Marcell Dekker, Inc., New York, N.Y., 1969.

Broadly the process of this invention for the reduction of silver salt to prepare crystalline silver particles ranging in size from about 10–100 microns, with the silver particles being characterized by exceptionally clean surfaces, comprises reducing a water soluble silver salt in a redox reaction at a temperature of about 0° to 50°C. for about 2 to 24 hours, the silver salt being present as an aqueous solution in a concentration of about 0.25–1.0 mole per liter of water, dilute nitric acid being present in the amount of 0.1 to 3 ml. per liter of silver salt solution, and a reducing agent characterized by an oxidation within −0.150 volts of the silver salt under the conditions of the reaction solution solubility of about 0.025 or more moles per liter of water at 25°C., and being present in the ratio to silver salt of 1 to 1.25 molar equivalents dissolved in about 0.5 to 2 liters of water.

A preferred process for the production of silver salts to prepare crystalline silver particles ranging in size from about 10–100 microns, the silver particles being characterized by exceptionally clean surfaces, comprises (a) preparing an aqueous solution of a silver salt, the concentration of said silver salt being in the range of about 0.25–1.0 mole per liter of water; (b) adding dilute nitric acid in the ratio of about 0.1 to 3.0 ml. per liter of said aqueous solution; (c) preparing an aqueous solution of reducing agent characterized by an oxidation of −0.150 volts of the silver salt under the conditions of the reaction solution, solubility of at least about 0.25 mole per liter at 25°C., and being present in a concentration of 1 to 1.25 molar equivalents based on the silver ion to be reacted, dissolved in about 0.5 to 2 liters of water; (d) blending said aqueous solution of reducing agent and said aqueous solution of silver salt to thereby reduce said silver salt in a redox reaction, said reaction being at a temperature of about 0°–50°C. for about 2 to 24 hours; (e) filtering and washing said silver particles until the filtrate is essentially clear; and (f) drying said silver particles.

The materials which will effect the following reaction to give large crystalline silver particles of this invention $$Ag^+ + e^- \longrightarrow Ag^0$$

have oxidation potentials within −0.150 volts of the potential of the silver salt under the conditions of the reaction. These reducing agents must also be soluble at least at the 0.25 moles/liter level in water. It is preferable that they be soluble at the 0.5 moles/liter level.

The materials which meet these requirements are both organic and inorganic reducing agents. The organic reducing agents of this invention include such materials as hydroquinone, toluhydroquinone, tert-butylhydroquinone, catechol, chlorohydroquinone, bromohydroquinone, pryrogallol or mixtures containing these reducing agents and other similar reducing agents. A preferred inorganic reducing agent is ferrous sulfate. Photographic silver halide developing agents having oxidation potentials as indicated are particularly useful in the practice of this invention. The reducing agents named above are known photographic developing agents. Other developing agents include aminophenol and o-phenylenediamine developing agents. The water soluble silver salts include salts such as silver nitrate, silver acetate, silver trifluoroacetate, and the like. Silver nitrate is a particularly preferred silver salt useful in the practice of this invention.

The initial acidification of the solution with dilute nitric acid is necessary to obtain the clean, conductive surfaces of the forming silver particles by dissolving minute amounts of the surface, thus exposing clean crystalline silver surfaces. In the case of the hydroquinone-type reducing agents, it is necessary to neutralize the also forming nitric acid with the slow addition of sodium acetate or similar material. If this is not done, the increasing acid concentration will dissolve the surfaces of the silver to the extent of greatly reducing the yields of silver powder. In the case of the ferrous sulfate, the oxidized ferric ion is able to accommodate the nitrate ion. Thus, neutralization is not necessary.

Another process for preparing silver particles having electrically conductive surfaces comprises the treatment of commercial silver powder by stirring the silver powder in a solution of 0.1 to 10 percent, based on the weight of the solution, of any of the above named organic reducing agents dissolved in a polar solvent such as water or a lower alcohol such as methanol. After the treatment the silver particles are collected by filtration and dried. This powder is found to have a very low electrical contact resistance.

The fact that the powders of the invention show almost no contact resistance is very surprising in view of the theory and application of electric contacts. (A relatively complete description of the theory, art, and technology of electric contacts is found in "Electric Contacts Theory and Application" by Ragnor Holm, 4th edition, Springer-Verlog New York, Inc., 1967). Particularly surprising is the fact that the silver powder produced by this process is stabilized in the very conductive condition even though it is exposed to air, moisture and airborne contaminants.

The following was done to further characterize the nature of the silver obtained by the above named processes. An apparatus was designed and assembled to measure a known volume of unpacked conductive powders where the electrical resistance and current could be measured at low applied voltages. The samples of powder were placed in a groove 0.107 × 0.107 × 3.3 cm. At each end of the groove copper contacts amalgamated with mercury were placed to contact the conductive powder. The mercury provided a contact free of electrical contact resistance. A Hewlett-Packard Voltimeter Model 410C was used to measure the electrical resistance of the powders with very low applied voltage and essentially zero current flow. This measurement is designated "passive resistance" (Rp). A Sorensen Model QRB15-2 regulated powder supply was used to measure applied voltage designated "breakdown voltage" (Vb), "voltage" (V), and current flow (I). Ohms Law equations were used to obtain a calculated electrical resistance (Rc). The table below lists the results obtained from the measurement of various silver powders.

Table

| Sample Description | Rp ohms | Vb volts | V volts | I amp. | Rc ohms |
|---|---|---|---|---|---|
| Silflake (A commercial silver powder made by Handy and Harman, 850 3rd Ave., New York, NY) | >500 × 10⁶ | >16 | 16 | 0 | ∞ |
| Silflake after washing with acetone | 2 – 500 × 10⁶ | >16 | 16 | 0 | ∞ |
| Silflake after washing with methanol | >500 × 10⁶ | >16 | 16 | 0 | ∞ |
| Silflake after washing with hexane | 1 × 10³ | ≃16 | 4 | 2.0 | 2.0 |
| Silflake after heating 6 hr. at 250 and <1mm. Hg pressure | 0.2 – 500 × 10⁶ | ≃16 | 1.6 | 2.0 | 0.8 |
| Prepared by reduction-aqueous hydroquinone | 0.8 | 3 | 1.1 | 2.0 | 0.55 |
| Prepared by reduction-aqueous hydroquinone | 1.8 | 3 | 1.2 | 2.0 | 0.60 |
| Silflake after washing with dilute nitric acid | 130 | 7 | 4.5 | 2.0 | 2.25 |
| Silflake after washing with a methanol solution of hydroquinone | 0.8 | 3.1 | 1.4 | 2.0 | 0.7 |

From these results it may be hypothesized that commercial silver particles as received have an oxidized and/or contaminated surface as is predicted by Holm. Silver powder made by reduction of silver ions and in particular that made by reduction using hydroquinone appears to have a clean, electrically conductive surface. Silver powder "cleaned" by treatment with hydroquinone is also electrically clean. However, according to theory these surfaces should become contaminated almost instantly on exposure to air. It is therefore further hypothesized that these "clean" silvers actually are stabilized by an adsorbed reducing agent and are only clean electrically.

This invention will be further illustrated by the following examples although it will be understood that these examples are included merely for purposes of illustration and are not intended to limit the scope of the invention.

EXAMPLE 1

A 3 liter, three-necked, round-bottom flask is equipped with a thermometer, a mechanical stirrer, and inlet ports from a Polystaltic pump which drains two reservoirs. One mole of silver nitrate dissolved in 1 liter of water and 2 ml. of dilute nitric acid are added to the flask and cooled to approximately 20°C. One liter of water containing 0.62 mole of hydroquinone is placed in one reservoir and 500 ml. of water containing 1 mole of sodium acetate is placed in the other reservoir. The mechanical stirrer agitates the solution at approximately 75 rpm. The addition of the hydroquinone solution is initiated and fed at such a rate as to complete addition in 30 minutes. Fifteen minutes after beginning the addition of the hydroquinone solution, the addition of sodium acetate solution is begun. It is also added at such a rate as to complete addition in 30 minutes. The reduction is allowed to proceed for 4 hours from the start of the hydroquinone addition. At this time, the larger crystalline silver particles are filtered and washed with water until the filtrate is clear. This requires about 10 liters of water. The silver powder is dried in a vacuum oven at 50°C. This yields a high quality silver powder in 94.2 percent yield.

EXAMPLE 2

The same equipment set-up as described in Example 1 is used. One mole of silver nitrate and 1 ml. of dilute nitric acid in 1 liter of water, 0.5 mole of toluhydroquinone in 1 liter of water and 1 mole of sodium acetate in 500 ml. of water are used as reactants. The toluhydroquinone solution is added to the chilled (approximately 5°C.) silver nitrate solution over a 1-hour period. The sodium acetate solution is also added over a 1-hour period beginning 30 minutes after the addition of toluhydroquinone. The reaction is allowed to proceed for 8 hours. The silver powder is filtered, washed, and dried, resulting in an 83.1 percent yield.

EXAMPLE 3

The same equipment set-up as described in Example 1 is used. One mole of silver nitrate in 1 liter of water is added to the flask and maintained at 20°C. One drop of dilute nitric acid is added. One mole of ferrous sulfate dissolved in 1 liter of water is placed in the reservoir. One drop of sulfuric acid is added. The ferrous sulfate solution is pumped into the flask over a 1-hour period. The reduction is allowed to proceed for 4 hours. The silver metal is filtered, washed with 10 liters of water, and dried 24 hours, in a vacuum oven at 50°C. A crystalline silver powder is obtained in 76.7 percent yield.

EXAMPLE 4

"Silflake," a commercial silver powder (sold by Handy & Harman) is treated by stirring the silver powder in a solution of 2 percent, based on the weight of the solution, hydroquinone dissolved in methanol. After 2 minutes the silver is collected by filtration. After drying, the powder is found to have very low electrical contact resistance as shown by the following comparative data. A volume of unpacked powder having the dimensions 0.107 × 0.107 × 3.3 mm. is measured for resistance along the 3.3 mm length using an Ohm meter having an input impedance of $10^9$ ohms. The following results were obtained when untreated Silflake silver powder, Silflake washed with methanol, and Silflake treated as described in the example were tested:

| | |
|---|---|
| Untreated "Silflake" | $R = >5 \times 10^8$ ohms |
| "Silflake" washed with methanol | $R = >5 \times 10^8$ ohms |
| "Silflake" washed with methanol containing 2% hydroquinone | $R = 0.8$ ohms |

Although the invention has been described in considerable detail with particular reference to certain preferred embodiments thereof, variations and modifications can be effected within the spirit and scope of the invention.

We claim:

1. Process for the reduction of water soluble silver salts to prepare crystalline silver particles ranging in size from about 10–100 microns, the silver particles being characterized by exceptionally clean, bright, electrically conductive surfaces, said process comprising reducing a water soluble silver salt in a redox reaction at a temperature of about 0° to about 50°C. for about 2 to 24 hours, said silver salt being present as an aqueous solution in a concentration of about 0.25–1.0 mole per liter of water, dilute nitric acid being present in the amount of 0.1 to 3 ml. per liter of silver salt solution, and a reducing agent characterized by an oxidation potential within −0.150 volts of the silver salt under the conditions of the reaction solution, solubility of about 0.025 or more moles per liter of water at 25°C., and being present in a concentration of 1 to 1.25 molar equivalents, based on the silver ion to be reduced, dissolved in about 0.5 to 2 liters of water.

2. Process of claim 1, wherein said silver salt is silver nitrate.

3. Product produced by the process of claim 1.

4. Process for the reduction of silver nitrate to prepare crystalline silver particles ranging in size from about 10–100 microns, the silver particles being characterized by exceptionally clean, bright, electrically conductive surfaces, said process comprising:
   a. preparing an aqueous solution of silver nitrate, the concentration of said silver nitrate being in the range of about 0.25–1.0 mole per liter of water;
   b. adding dilute nitric acid in the ratio of about 0.1 to 3.0 ml. per liter of said aqueous solution;
   c. preparing an aqueous solution of reducing agent characterized by a oxidation within −0.150 of the silver salt under the conditions of the reaction solution, solubility of at least about 0.25 mole per liter at 25°C., and being present in the concentration of 1 to 1.25 molar equivalents, based on the silver nitrate, dissolved in about 0.5 to 2 liters of water;

d. blending said aqueous solution of reducing agent and said aqueous solution of silver nitrate to thereby reduce said silver nitrate in a redox reaction, said reaction being at a temperature of about 0–50°C. for about 2 to 24 hours;

e. filtering and washing said silver particles until the filtrate is essentially clear, and f. drying said silver particles.

5. Product produced by the process of claim 4.

6. Process for preparing silver powder having bright electrically conductive surfaces comprising treating silver powder with a phenolic reducing compound dissolved in a polar organic solvent, the solute/solvent ratio being in the range of 0.1/1.00 to 10/100, and collecting the treated silver.

7. Process of claim 6 wherein said phenolic reducing compound is hydroquinone and said polar organic solvent is methanol.

8. Product produced by the process of claim 6.

* * * * *